J. C. Gillett,
Cutting Shingles.
No. 62. Reissued Apr. 30, 1844.
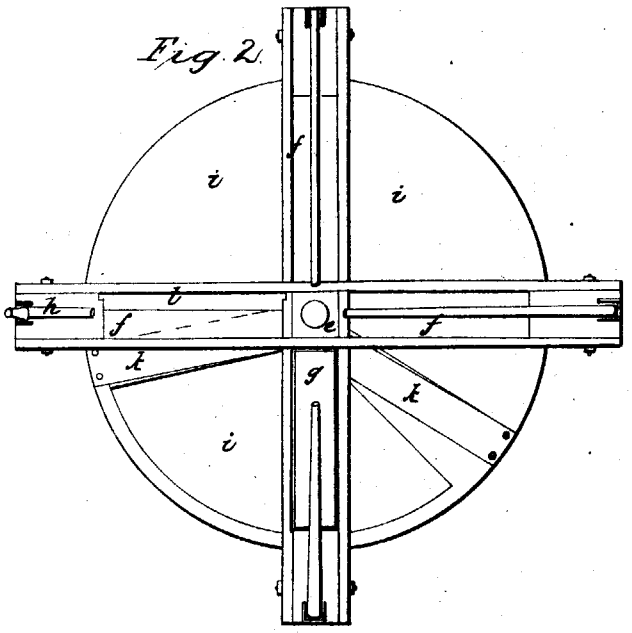
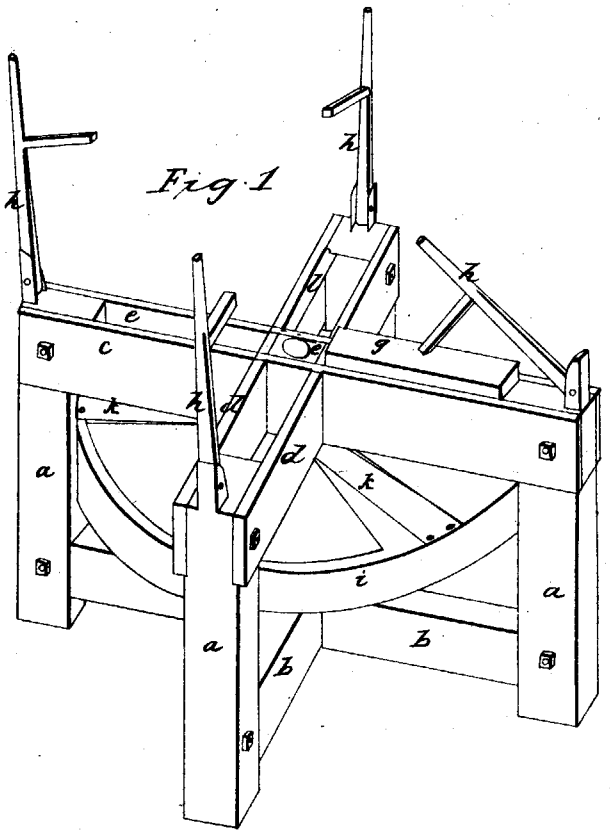
AM. PHOTO-LITHO. CO. N.Y. (OSBORNE'S PROCESS)

UNITED STATES PATENT OFFICE.

JASON C. GILLETT, OF BLOOMFIELD, MICHIGAN.

IMPROVEMENT IN MACHINES FOR CUTTING SHINGLES.

Specification forming part of Letters Patent No. 3,382, dated December 20, 1843; Reissue No. 62, dated April 20, 1844.

*To all whom it may concern:*

Be it known that I, JASON C. GILLETT, of Bloomfield, in the county of Oakland and the State of Michigan, have invented a new and Improved Machine for the Cutting of Shingles, and by means of which stuff of different kinds may be cut of equal thickness for every variety of use, which machine I have denominated the "self-feeding shingle and wood cutter;" and I do hereby declare that the following is a full and exact description thereof.

In the accompanying drawings, Figure 1 is a perspective representation of the machine, and Fig. 2 a top view thereof.

In each of these figures the same letters of reference are used to designate the same parts.

The frame is shown as consisting of four posts, *a a*, and of two ties, *b b*, which are framed into the posts near their lower ends. These ties cross each other at their middles, where they are halved together. They serve to receive a step in which runs the vertical shaft of a horizontal wheel or table, (shown at *i i*.) This table carries two knives, *k k*, which by its revolution are made to cut the shingles or other stuff from any suitable timber which has been previously sawed into scantling and cut into blocks of the proper length. The timber to be cut is placed within stationary hoppers or boxes *f f* above the table, there being four of these represented in the drawings; but their number may be increased, if desired. The hoppers or boxes may be most conveniently formed, as shown in the drawings, by extending the posts *a a* above the table, and bolting to them pieces of plank *c c d d*, which pieces are to be at such distance apart as may be necessary to admit the widest stuff that is to be cut. The plank *c c d d*, which constitute the sides of the hoppers, cross each other at right angles, being notched or framed together so as to admit a box at *e*, in which the upper journal of the shaft of the revolving table runs. A block, *g*, that is to be cut into shingles or other articles, is shown within one of the hoppers. These blocks may at first be sufficiently heavy to descend by their own gravity; but when much reduced this will not be the case. I therefore attach to each hopper a hammer-formed lever, as shown at *h h*. One of these is represented as pressing on the block *g*.

It will be seen by inspecting the drawings that the hammer-levers are so arranged as that the reduction of the block will cause them as they assume a horizontal position to press upon it with an increased weight, and this may be so adjusted as to cause the pressure to be uniform, or nearly so. When stuff is to be cut that is narrower than the hopper, a piece of wood, of proper thickness, as shown at *l*, may be inserted therein, grooves being provided in the ends of the hopper to receive such pieces.

The wheel *i i* may be made either of wood or cast-iron, as may also the whole frame of the machine. The diameter of the wheel or table and the dimensions of the other parts of the machine may, of course, be varied to adapt it to the purpose for which it is to be used. That which I have constructed, and from which the drawings have been made, has the following dimensions: The posts are five and a half inches square and two feet eight inches long. The cross-ties *b b* are of the same scantling with the posts. The hoppers are eighteen inches in length in the clear and four inches and a half in width. Their sides *c c d d* are of two-inch plank and seven inches in width.

When the table is made of wood, it must be sufficiently thick to insure its stability, and it may then be driven by a belt which will embrace its periphery. When it is of cast-iron, the proper width to receive the belt may be given to its periphery by means of a flange cast thereon. The upper sides of the knives *k k* are even with the surface of the wheel or table *i i*, and they are so placed upon it as that only one of them shall be in the act of cutting at the same time. For this purpose the spaces between them are unequal. Their exact position in this respect would be such as that a vertical plane passing through their edges would form an angle of about one hundred and forty-one degrees on one side and of about two hundred and nineteen degrees on the other.

When the table is constructed of wood, I make the knives seven inches wide. When it is of iron, knives of five inches in width will be sufficient. They are to be firmly secured on the table by screw-bolts at their ends. From the position in which they are placed they cut the timber obliquely to its grain, and as they run within a sixteenth of an inch of the lower edges of the hoppers, this effectually prevents the spoiling or splitting of the stuff as they pass through it. The bevel given to the knives in grinding I have found to be a thing of great moment, as upon this and the position of their cutting-edges their due operation is dependent. The under side of each of the knives has a bevel of three-sixteenths of an inch to the inch for the first three inches back from the edge, and is slightly concave. The upper side bevels one-sixteenth of an inch to the inch, such bevel extending to the width of one inch only from the edge, the remainder of the upper side of the knife being on the same horizontal level with the same table. Any considerable departure from this form of the knife interferes with its proper operation. The bevel on its upper side counteracts its tendency to rise—a tendency which is the result of the necessary bevel on its lower side. The thickness of the shingle or of any other article to be cut is not to be regulated by the regulating of the knife, as the upper surface of this is always to remain on the plane of the upper surface of the table, and the thickness or form of the article when cut is determined by the construction of the table itself. Before the edge of each knife an excavation is to be made in the table of such length and width as will admit the block to be cut, and to such depth as will correspond with the intended thickness of the article, and from the back of the knife to this part the face of the table is to constitute an inclined plane, down which the block will descend as it is approached by the edge of the knife.

When shingles are to be cut, the excavations in front of the edge of the knife must correspond at one end with the thickness to be given to the butt, and at the other to the thickness of the point or thin end, and in the two excavations these will be reversed, the thick end in one being toward the circumference and in the other toward the center of the table.

Having thus fully described the manner in which I construct my machine for cutting shingles and other articles of wood, and explained the operation thereof, I do hereby declare that I do not claim the use of a horizontal rotary wheel or cutting-knives when taken alone; but

What I do claim as of my invention, and desire to secure by Letters Patent, is—

The manner in which I have arranged and combined the hoppers or boxes to receive the stuff to be cut with the hammer-levers, with the horizontal table, and with the knives attached thereto, said knives being so arranged in the manner represented as that one shingle or other article shall be cut by one knife before the other begins to operate, in the case of a shingle the butt being cut by one knife toward the shaft and by the other toward the periphery of the wheel.

JASON C. GILLETT.

Witnesses:
F. A. FLOWER,
JAS. GOW.